(12) United States Patent
Sawamoto et al.

(10) Patent No.: US 7,964,855 B2
(45) Date of Patent: Jun. 21, 2011

(54) SCINTILLATOR PANEL

(75) Inventors: Naoyuki Sawamoto, Hachioji (JP); Takehiko Shoji, Hachioji (JP); Masashi Kondo, Hachioji (JP)

(73) Assignee: Konica Minolta Medical & Graphic, Inc. (JP)

( * ) Notice: Subject to any disclaimer, the term of this patent is extended or adjusted under 35 U.S.C. 154(b) by 0 days.

(21) Appl. No.: 12/594,263

(22) PCT Filed: Apr. 3, 2008

(86) PCT No.: PCT/JP2008/056679
§ 371 (c)(1),
(2), (4) Date: Oct. 1, 2009

(87) PCT Pub. No.: WO2008/126757
PCT Pub. Date: Oct. 23, 2008

(65) Prior Publication Data
US 2010/0117006 A1 May 13, 2010

(30) Foreign Application Priority Data

Apr. 5, 2007 (JP) ................................ 2007-099234

(51) Int. Cl.
*H05B 33/00* (2006.01)
(52) U.S. Cl. .................................................. 250/484.4
(58) Field of Classification Search ............. 250/370.01–370.15, 484.2–484.5; 378/98.8
See application file for complete search history.

(56) References Cited

U.S. PATENT DOCUMENTS

| 3,855,035 | A | * | 12/1974 | Bates et al. | 156/276 |
| 2003/0042429 | A1 | * | 3/2003 | Isoda | 250/484.4 |
| 2003/0047697 | A1 | | 3/2003 | Iwabuchi et al. | |
| 2008/0083877 | A1 | * | 4/2008 | Nomura et al. | 250/370.11 |

FOREIGN PATENT DOCUMENTS

| JP | 2003-28994 A | 1/2003 |
| JP | 2003-50298 A | 2/2003 |
| JP | 2005-106541 A | 4/2005 |
| JP | 2005-148060 A | 6/2005 |
| JP | 2006-225733 A | 8/2006 |

OTHER PUBLICATIONS

International Search Report for International Application No. PCT/JP2008/056679 mailed Jun. 10, 2008 with English translation.

* cited by examiner

*Primary Examiner* — David P Porta
*Assistant Examiner* — Kiho Kim
(74) *Attorney, Agent, or Firm* — Cantor Colburn LLP

(57) ABSTRACT

A scintillator panel exhibiting enhanced emission luminance is disclosed, comprising a phosphor layer containing a phosphor capable of emitting light upon exposure to radiation, a substrate supporting the phosphor layer and a protective film covering the phosphor layer and the substrate, wherein the phosphor layer comprises two or more layers, and satisfying the following expression 1:

$$1.0 \leq B/A \leq 1000 \quad \text{Expression 1:}$$

wherein B is an average activator concentration (mol %) of an uppermost phosphor layer, based on a phosphor and A is an average activator concentration (mol %) of the other phosphor layers, based on a phosphor.

4 Claims, 1 Drawing Sheet

SCINTILLATOR PANEL

This is a U.S. national stage application of International Application No. PCT/JP2008/056679, filed on 03 Apr. 2008. Priority under 35 U.S.C. §119(a) and 35 U.S.C. §365(b) is claimed from Japanese Application No. JP2007-099234, filed 05 April 2007, the disclosure of which is also incorporated herein by reference.

TECHNICAL FIELD

The present invention relates to a scintillator panel exhibiting enhanced emission luminance.

TECHNICAL BACKGROUND

There have been broadly employed radiographic images such as X-ray images for diagnosis of the conditions of patients on the wards. Specifically, radiographic images using a intensifying-screen/film system have achieved enhancement of speed and image quality over its long history and are still used on the scene of medical treatment as an imaging system having high reliability and superior cost performance in combination. However, these image data are so-called analog image data, in which free image processing or instantaneous image transfer cannot be realized.

Recently, there appeared digital system radiographic image detection apparatuses, as typified by a computed radiography (also denoted simply as CR) and a flat panel radiation detector (also denoted simply as FPD). In these apparatuses, digital radiographic images are obtained directly and can be displayed on an image display apparatus such as a cathode tube or liquid crystal panels, which renders it unnecessary to form images on photographic film. Accordingly, digital system radiographic image detection apparatuses have resulted in reduced necessities of image formation by a silver salt photographic system and leading to drastic improvement in convenience for diagnosis in hospitals or medical clinics.

The computed radiography (CR) as one of the digital technologies for radiographic imaging has been accepted mainly at medical sites. However, image sharpness is insufficient and spatial resolution is also insufficient, which have not yet reached the image quality level of the conventional screen/film system. Further, there appeared, as a digital X-ray imaging technology, an X-ray flat panel detector (FPD) using a thin film transistor (TFT), as described in, for example, the article "Amorphous Semiconductor Usher in Digital X-ray Imaging" described in Physics Today, November, 1997, page 24 and also in the article "Development of a High Resolution, Active Matrix, Flat-Panel Imager with Enhanced Fill Factor" described in SPIE, vol. 32, page 2 (1997).

To convert radiation to visible light is employed a scintillator panel made of an X-ray phosphor which is emissive for radiation. The use of a scintillator panel exhibiting enhanced emission efficiency is necessary for enhancement of the SN ratio in radiography at a relatively low dose.

Generally, the emission efficiency of a scintillator panel depends of the scintillator thickness and X-ray absorbance of the phosphor. A thicker phosphor layer causes more scattering of emission within the phosphor layer, leading to deteriorated sharpness. Accordingly, necessary sharpness for desired image quality level necessarily determines the layer thickness.

Specifically, cesium iodide (CsI) exhibits a relatively high conversion rate of from X-rays to visible light. Further, a columnar crystal structure of the phosphor can readily be formed through vapor deposition and its light guide effect inhibits scattering of emitted light within the crystal, enabling an increase of the phosphor layer thickness.

However, the use of CsI alone results in reduced emission efficiency. For example, Japanese Patent Publication JP-B 54-35060 disclosed a technique for use as an X-ray phosphor in which a mixture of CsI and sodium iodide (NaI) at any mixing ratio was deposited on a substrate to form sodium-activated cesium iodide (CsI:Na); and recently, a mixture of CsI and thallium iodide (TlI) at any mixing ratio was deposited on a substrate to form thallium-activated cesium iodide (CsI:Tl), which was further subjected to annealing as a post-treatment to achieve enhanced visible-conversion efficiency.

There were also proposed other means for enhancing light output, including, for example, a technique of rendering a substrate to form a scintillator thereon reflective; a technique of forming a reflection layer on a substrate; and a technique of a scintillator on a transparent organic film covering a reflective thin metal film provided on a substrate. There was also known a technique in which an activator concentration was made uniform at any portion of a phosphor layer, resulting in enhanced emission luminance (as described in, for example, Patent document 1.

However, there has been desired a scintillator panel of enhanced emission efficiency.

There were also known a technique in which a scintillator was coated on columnar crystals formed on a FOP substrate to emit two color luminescence (as described in, for example, Patent document 2) and a technique of using a scintillator panel provided with a phosphor layer having a plural-layered structure (as described in, for example, Patent document 3), either of which was not aimed at enhancement of emission luminance.

Patent document 1: JP 2003-28994A
Patent document 2: JP 2005-106541A
Patent document 3: JP 2005-148060A

DISCLOSURE OF THE INVENTION

Problem to be Solved

It is an object of the present invention to provide a scintillator panel exhibiting enhanced emission luminance.

Means for Solving the Problem

The object of the present invention can be achieved by the following constitution.

1. A scintillator panel comprising a phosphor layer containing a phosphor capable of emitting light upon exposure to radiation, a substrate supporting the phosphor layer and a protective film covering the phosphor layer and the substrate, wherein the phosphor layer comprises two or more layers and the following requirement 1 is satisfied:

$$1.0 \leq B/A \leq 1000 \qquad \text{Expression 1}$$

wherein B is an average activator concentration (mol %) of an uppermost phosphor layer, based on a phosphor of the uppermost phosphor layer and A is an average activator concentration (mol %) of the other phosphor layers, based on a phosphor of the other phosphor layers.

2. The scintillator panel described in the foregoing 1, wherein the phosphor is cesium iodide.

3. The scintillator panel described in the foregoing 1 or 2, wherein the activator comprises at least one of thallium iodide, thallium europium and thallium bromide.

4. The scintillator panel described in any of the foregoing 1 to 3, wherein the phosphor layer comprises two or more layers and at least one phosphor layer other than the uppermost phosphor layer contains no activator.

Effect of the Invention

According to the present invention, there was provided a scintillator panel exhibiting enhanced emission luminance.

DESCRIPTION OF NUMERALS

Figure 1:
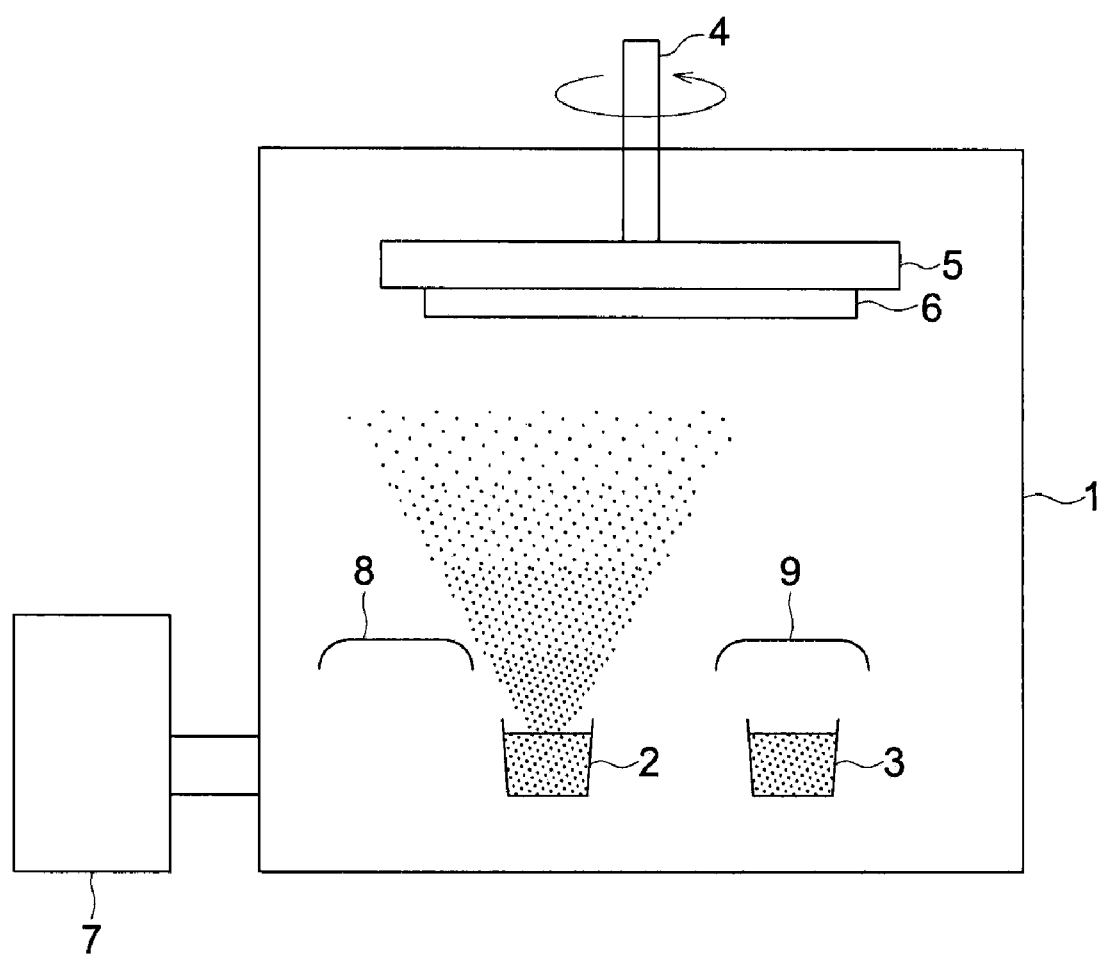
FIG. 1 illustrates a vapor deposition apparatus related to the present invention.

1: Vapor deposition apparatus
2, 3: Resistance heating crucible
4: Rotation mechanism
5: Substrate holder
6: Substrate
7: Vacuum pump
8, 9: Shutter

PREFERRED EMBODIMENTS OF THE INVENTION

It was found by the inventors that the phosphor layer was composed of plural layers and the following expression was satisfied:

$$1.0 \leq B/A \leq 1000,$$

preferably, $$1.0 \leq B/A \leq 500$$

and more preferably, $$1.0 \leq B/A \leq 200$$

wherein B is the average concentration (mol %) of an activator of the uppermost phosphor layer, based on the phosphor in the uppermost phosphor layer and A is the average concentration (mol %) of an activator of other phosphor layers, based on the phosphor of the other phosphor layers, thereby achieving an improvement in emission luminance.

It is presumed that providing plural phosphor layers gives rise to locally high-concentrated activator portions to exist locally and providing a phosphor layer of a high activator concentration on the uppermost surface results in reduced optical loss when light emitted from the surface portion reaches a light-receiving section, thereby proving a scintillator panel exhibiting enhanced emission luminance. In the case when a phosphor layer is constituted of a plurality of two or more layers, there may be provided a layer containing no activator, as a layer other than the outermost surface layer. Specifically, it is preferred to provide a lowermost phosphor layer containing no activator and further thereon, plural phosphor layers so that the relationship of the foregoing expression (1) is satisfied, whereby further enhanced sharpness (MTF characteristic) is achieved. Herein, the layer containing no activator refers to a layer containing substantially no activator and more specifically, it refers to a layer containing an activator at an average concentration of not more than 0.001 mol %, based on the phosphor content. The thickness of such a layer containing no activator is preferably from 1 to 50 μm, and more preferably from 2 to 20 μm in terms of enhanced sharpness being achieved, while maintaining emission luminance. The average activator concentration of a layer containing an activator is preferably in the range of from 0.005 to 50 mol %, and more preferably, from 0.1 to 20 mol %, based on phosphor in terms of emission efficiency.

The scintillator panel of the present invention is provided with a phosphor layer which emits light upon exposure to radiation, a substrate supporting the phosphor layer and a protective film which covers the phosphor layer and the substrate.

There will be described the respective constitutions of the scintillator panel of the present invention.

Substrate

There may be used a various kinds of substrates for production of the scintillator panel of the present invention. Namely, there may be used a variety of glass, polymeric materials and metals which are capable of permitting radiation such as X-rays to be transmitted. There are usable, for example, plate glass such as quartz, borosilicate glass and chemically reinforced glass; a ceramic substrate such as sapphire, silicon nitride and silicon carbide; a semiconductor substrate such as silicon, germanium, gallium arsenide, gallium phosphide and gallium nitride; polymeric film (plastic film) such as cellulose acetate film, polyester film, polyethylene terephthalate film, polyamide, polyimide film, triacetate film, polycarbonate film and carbon fiber reinforced plastic; a metal sheet such as aluminum sheet, iron sheet, copper sheet or a metal sheet having a covering layer of its metal oxide. The thickness of a substrate is preferably from 50 μm to 1 mm, and more preferably from 50 to 500 μm.

Phosphor Layer

The phosphor of the phosphor layer relating to the present invention refers to a phosphor which absorbs energy of an incident radiation such as X-rays and emitting an electromagnetic wave having a wavelength of 300 nm to 800 nm, that is, an electromagnetic wave (light) of from ultraviolet rays to infrared rays around visible light.

The phosphor layer related to the present invention is comprised of plural layers of at least two layers and prepared in such a manner that plural crucibles filled with a raw material are provided, one of them is heated to vaporize the raw material and the vaporized raw material is allowed to be deposited at a given thickness on a support, and such a deposition process is repeated using remaining crucibles.

A variety of known phosphor materials are usable as a material to form a phosphor, but cesium iodide (CsI) is preferred, which exhibits a relatively high transforming efficiency of from X-rays to the visible light, can easily form a phosphor of a columnar crystal structure, can inhibit scattering of emitted light within crystals through a light guide effect and can also form increased the thickness of the phosphor layer. Since CsI alone is inherently low in emission efficiency, it is preferred to incorporate various activators.

Examples thereof include a mixture of CsI and sodium iodide (NaI) at a given molar ratio, as described in JP 54-35060B. In the present invention, there is preferably used an activator selected from thallium iodide, europium iodide and thallium bromide.

In the phosphor of the present invention, activator concentrations are related to satisfying the afore-described expression 1 in which the activator concentration of the uppermost surface layer is to be A mol % and that of layer(s) other than the uppermost surface layer is to be B mol %. The phosphor layer thickness is preferably from 50 to 1000 μm to achieve enhancement of emission efficiency and sharpness, and is more preferably from 100 to 800 μm.

Protective Film

A protective film, which protects a phosphor layer from moisture to inhibit deterioration of the phosphor layer, is composed of a film exhibiting a relatively low moisture permeability. There is usable, for example, polyethylene terephthalate (also denoted as PET) film. Examples of a film other than PET include a polyester film, polymethacylate film, nitrocellulose film, cellulose acetate film, polypropylene film and polyethylene naphthalate film. Such a film may be layered with a deposit film of a metal oxide or the like so as to meet the desired moisture-proof.

A thermally adhesive resin to achieve sealing through thermal adhesion is used on the opposed surfaces of the substrate side and the phosphor layer side of a scintillator sheet. There is usable, as a thermally adhesive layer, a resin film which is thermally adhesive by a generally used impulse sealer. Examples thereof include a copolymer of ethylene and vinyl acetate (EVA), polypropylene (PP) film and polyethylene (PE) film but are not limited to these.

The scintillator sheet is sandwiched between upper and lower protective films and the edge portions at which the upper and lower protective films are in contact with each other are thermally adhered to form a seal.

In the present invention, the thickness of a protective film is preferably from 10 to 100 μm.

In the present invention, the protective film is provided with moisture-proofing. Specifically, the moisture permeability (also called water vapor transmission rate) of a protective film is preferably not more than 50 g/m$^2$·day, more preferably not more than 10 g/m$^2$·day, and still more preferably not more than 1 g/m$^2$·day. The moisture permeability of a protective film can be determined according to the method defined in JIS Z 0208.

To be more precise, the moisture permeability in the present invention can be determined in the manner described below. At a temperature of 40° C., the foregoing protective film is placed as a boundary, and one side is maintained at a humidity of 90% RH and the other side is maintained in the dry state by using a moisture absorbent. The mass (g per 1 m$^2$ of protective film) of water vapor which is transmitted through this protective film for 24 hrs. under such a condition is defined as the moisture permeability of the protective film of the present invention.

To control the moisture permeability of a protective film within the range described above and achieve enhanced moisture-proofing, a deposited film is preferred in which a thin film of aluminum oxide is deposited onto polyethylene terephthalate film.

Light transmittance of a protective film is represented by a relative value, based on the light transmittance of air being 100%. The foregoing light transmittance can be determined according to the following formula:

Light transmittance (%)=(transmitted light)/(incident light)×100

In addition to the above-described constitution, the scintillator panel of the invention may be provided with a reflection layer between the substrate and a phosphor layer or with a protective layer.

Reflection Layer

In the present invention, a reflection layer can function as one which causes light converted in a phosphor to exit and a reflection layer formed of a highly reflective metal is preferred in terms of utilization efficiency of emitted light. Examples of a highly reflective metal thin-film include materials containing a substance selected from the group of Al, Ag, Cr, Cu, Ni, Mg, Pt and Au. The reflection layer related to the present invention may be formed by the methods known in the art, including, for example, a sputtering treatment using the foregoing raw materials. The thickness of a reflection layer is preferably from 0.01 to 0.3 μm in terms of extraction efficiency of emitted light.

The electric conductivity of a conductive metal related to the present invention is preferably not less than 6.0 S/m (siemens per m), and more preferably not less than 30 S/m. Specifically, Al (40 S/m), Ag (67 S/m) and Au (46 S/m) are preferred in terms of reflectance or electric conductivity.

Protective Layer

Preferably, coating a resin dissolved in a solvent and drying it forms a protective layer. A polymer exhibiting a glass transition point of 30 to 100° C. is preferred in terms of adhesion of a deposit crystal to the substrate. Specific examples thereof include a polyurethane resin, a vinyl chloride copolymer, a vinyl chloride/vinyl acetate copolymer, a vinyl chloride/vinylidene chloride copolymer, a vinyl chloride/acrylonitrile copolymer, vinyl chloride/acrylonitrile copolymer, a butadiene/acrylonitrile copolymer, polyvinyl butyral, a polyester resin, a cellulose derivative such as nitrocellulose), a styrene/butadiene copolymer, various synthetic rubber resins, a phenol resin, an epoxy resin, a urea resin, a melamine resin, a phenoxy resin, a silicone resin, an acryl resin and a urea formamide resin. Of these, a polyester resin is specifically preferred.

The thickness of a protective layer is preferably not less than 0.1 μm in terms of adhesion property and not more tan 3.0 μm to ensure smoothness of the protective layer surface. More preferably, the thickness of a transparent insulating film falls within the range of from 0.2 to 2.5 μm.

Examples of a solvent used for preparation of a protective film include a lower alcohol such as methanol, ethanol, n-propanol or n-butanol; a chlorinated hydrocarbon such as methylene chloride or ethylene chloride; a ketone such as acetone, methyl ethyl ketone or methyl isobutyl ketone; an aromatic hydrocarbon such as toluene, benzene, cyclohexane, cyclohexanone or xylene; an ester of a lower carboxylic acid and a lower alcohol such as methyl acetate, ethyl acetate or butyl acetate; and an ether such as ethylene glycol monoethyl ether or ethylene glycol monomethyl ether, and their mixture.

Formation of Phosphor Layer

A phosphor layer related to the present invention can be formed by using a deposition apparatus illustrated in FIG. 1.

Formation of Scintillator Panel

A scintillator sheet provided with a phosphor layer on the substrate is sandwiched between upper and lower protective films and the edge portion at which upper and lower protective films are in contact with each other is adhered in an atmosphere of reduced pressure to be sealed, whereby a scintillator panel is formed. When depositing a phosphor layer, the temperature of the substrate is preferably set to 25 to 300° C., and more preferably 50 to 250° C.

EXAMPLES

The present invention will be further described with reference to examples but the present invention is not limited to these.

Example 1

Preparation of Scintillator Panel 1
Preparation of Evaporation Source Material-1

CsI was mixed with an activator raw material of 0.3 mol % thallium iodide (TlI) and was ground in a mortar to obtain a homogeneous mixture.

Preparation of Evaporation Source Material-2

CsI was mixed with an activator raw material of 0.03 mol % thallium iodide (TlI) and was ground in a mortar to obtain a homogeneous mixture.

Preparation of Evaporation Source Material-3

CsI was ground in a mortar without using an activator raw material to obtain a homogeneous mixture.

Preparation of Phosphor Layer

Using a deposition apparatus 1, as shown in FIG. 1, each of the foregoing evaporation source materials was deposited onto one side of an substrate formed of aluminum to form a phosphor layer.

Initially, the evaporation source material-1 was allowed to fill up in a resistance heating crucible 2 as an evaporation source and the evaporation source material-2 was allowed to fill up in a resistance heating crucible 3 as an evaporation source. A substrate 6 was placed onto a substrate holder 5 which was rotatable by a rotation mechanism 4. The distance between the substrate 6 and the resistance heating crucible 3 was controlled to 700 mm.

Subsequently, the interior of the deposition apparatus 1 was evacuated by a evacuation pump 7 and after Ar gas was introduced thereto to control a degree of vacuum to 0.01 Pa, the substrate 6 was held at a temperature of 200° C., while rotating the substrate 6 at a speed of 10 rpm by the rotation mechanism 4. The resistance heating crucible 2 was heated and a shutter 8 was opened to deposit a phosphor. When the total thickness of a phosphor layer reached 250 μm, deposition of the first layer onto the substrate 6 was completed. Then, the resistance heating crucible 3 was heated and a shutter 8 was opened to deposit a phosphor. When the total phosphor layer thickness reached 500 μm, deposition of the second layer was completed, whereby a phosphor layer comprised of two layers was prepared.

Preparation of Protective Film and Sealing

A protective film on the phosphor layer side employed a laminated film of polyethylene terephthalate (PET) film and casting polypropylene (CPP) film. Lamination of the films was conducted through dry lamination and the thickness of an adhesive layer was 1 μm. The adhesive used therein was a two component type urethane adhesive and the same one was used for a protective film on the substrate side. These protective films arranged on the top and the bottom were adhered to a seal by using an impulse sealer, whereby a scintillator panel 1 was prepared.

Preparation of Scintillator Panel 2

Scintillator panel 2 was prepared in the same manner as the scintillator panel 1, except that the amount of thallium iodide (TlI) of the evaporation source material-2 was varied to 0.3 mol %.

Preparation of Scintillator Panel 3

Scintillator panel 3 was prepared in the same manner as the scintillator panel 1, except that the amount of thallium iodide (TlI) of the evaporation source material-2 was varied to 6.0 mol and when the total thickness of a phosphor layer reached 450 μm, deposition of the first layer onto the substrate was completed.

Preparation of Scintillator Panel 4

Scintillator panel 4 was prepared in the same manner as the scintillator panel 1, except that, using the evaporation source material-1, deposition was completed when the total thickness of a phosphor layer reached 500 μm, whereby a phosphor layer of a single layer was formed.

Preparation of Scintillator Panel 5

Scintillator panel 5 was prepared in the same manner as the scintillator panel 1, except that the amount of thallium iodide (TlI) of the evaporation source material-2 was varied to 3.0 mol %.

Preparation of Scintillator Panel 6

Scintillator panel 6 was prepared in the same manner as the scintillator panel 3, except that the amount of thallium iodide (TlI) of the evaporation source material-1 was varied to 0.18 mol %.

Preparation of Scintillator Panel 7

Scintillator panel 7 was prepared in the same manner as the scintillator panel 3, except that the amount of thallium iodide (TlI) of the evaporation source material-1 was varied to 0.072 mol %.

Preparation of Scintillator Panel 8

Scintillator panel 8 was prepared in the same manner as the scintillator panel 3, except that the amount of thallium iodide (TlI) of the evaporation source material-1 was varied to 0.045 mol %.

Preparation of Scintillator Panel 9

Scintillator panel 9 was prepared in the same manner as the scintillator panel 3, except that the amount of thallium iodide (TlI) of the evaporation source material-1 was varied to 0.030 mol %.

Preparation of Scintillator Panel 10

Scintillator panel 10 having a total layer thickness of 500 μm was prepared in the same manner as the scintillator panel 2, except that the evaporation source material-3 was used instead of the evaporation source material-1, and before performing evaporation of the evaporation source material-2, the resistance heating crucible 2 was heated and then the shutter 8 was opened to allow a phosphor to be deposited, and when the phosphor layer thickness reached 10 μm, deposition of the second layer was completed.

Preparation of Scintillator Panel 11

Scintillator panel 11 was prepared in the same manner as the scintillator panel 3, except the evaporation source material-3 was allowed to fill up in a resistance heating crucible (not shown in the drawing) of an evaporation source and the distance between the substrate 6 and the resistance heating crucible was controlled to be 700 mm; and before performing evaporation of the evaporation source material-1, the resistance heating crucible was heated and then a shutter (not shown in the drawing) was opened to deposit a phosphor, and when the phosphor layer thickness reached 10 μm, deposition was completed.

Evaluation

Measurement of Luminance

The thus obtained panels were each set onto a 10×10 cm CMOS flat panel (X-ray CMOS camera system Shadow-Box 4KEV, produced by Rad-icon Imaging Corp.) and the rear of each sample (i.e., the side having no phosphor scintillator layer) was exposed to X-rays at a tube voltage of 80 kVp. The measured value of instantaneous emission was defined as luminance (sensitivity).

Measurement results are shown in Table 1. In Table 1, luminance is represented by a relative value, based on the luminance of the scintillator panel 4 being 1.00.

Measurement of Activator Concentration

An activator concentration was measured in an inductively coupled plasma atomic emission spectrometer, ICP-AES. Columnar crystals formed through vapor deposition were each divided at the boundary of the first layer and the second layer through the of thickness of the crystal and activator concentration of each of the divided portions was determined.

Typically, the quantity of thallium was determined in such a manner that concentrated hydrochloric acid was added to the phosphor sample which was peeled from the substrate, dried by heating and was again dissolved by adding aqua regia with heating. The thus obtained solution was optimally diluted with a super pure water and subjected to measurement. Activator concentration was represented by a molar ratio (mol %) to cesium iodide. The results thereof are shown in Table 1.

TABLE 1

| Scintillator Panel | Activator Concentration (mol %) | | B/A | Emission Luminance | Remark |
|---|---|---|---|---|---|
| | A: First Layer | B: Second Layer | | | |
| 1 | 0.1 | 0.01 | 0.1 | 1.1 | Comp. |
| 2 | 0.1 | 0.1 | 1 | 1.5 | Inv. |
| 3 | 0.05 | 6 | 120 | 1.8 | Inv. |
| 4 | 0.05 | — | — | 1.0 | Comp. |
| 5 | 0.1 | 1.0 | 10 | 1.8 | Inv. |
| 6 | 0.03 | 6 | 200 | 1.8 | Inv. |
| 7 | 0.012 | 6 | 500 | 1.4 | Inv. |
| 8 | 0.0075 | 6 | 800 | 1.4 | Inv. |
| 9 | 0.005 | 6 | 1200 | 1.0 | Comp. |
| 10 | 0.0005 | 0.1 | 200 | 1.8 | Inv. |

As shown in Table 1, it was proved that scintillator panels according to the present invention resulted in improved emission luminance, as compared to a comparative scintillator panel of a single phosphor layer or a comparative sample having a B/A value of not more than 1. Scintillator panel 10 exhibited an activator concentration of 0.0005 mol %, which was assumed to be due to the transfer of an activator from the second layer resulting from heating the substrate during deposition or by heat generated on deposition, and was also superior in sharpness (MTF characteristic) as well as emission luminance, as compared to Scintillator panel 2. With respect to Scintillator panel 11, it was proved that A=0.049 (mol %), B=6 (mol %), B/A=122, and the emission luminance was 2.0. Thus, in addition to emission luminance, enhanced sharpness (MTF characteristic) was also achieved, as compared to Scintillator panel 3.

What is claimed is:

1. A scintillator panel comprising:
a phosphor layer,
a substrate supporting the phosphor layer,
and a protective film covering the phosphor layer and the substrate,
the phosphor layer being configured to emit light upon exposure to radiation incident from a side of the substrate not having the phosphor layer,
wherein the phosphor layer comprises two or more layers, and satisfying the following expression 1:

$$1.0 \leq B/A \leq 1000 \quad \text{Expression 1:}$$

wherein B is an average activator concentration (mol%) of an uppermost phosphor layer, based on a phosphor and A is an average activator concentration (mol%) of the other phosphor layers, based on a phosphor, the uppermost phosphor layer being provided on a side opposite to a side upon which the radiation is incident.

2. The scintillator panel as claimed in claim 1, wherein the phosphor is cesium iodide.

3. The scintillator panel as claimed in claim 1, wherein the activator comprises at least one of thallium iodide, thallium europium and thallium bromide.

4. The scintillator panel as claimed in claim 1, wherein the phosphor layer comprises two or more layers and at least one phosphor layer other than the uppermost phosphor layer contains no activator.

* * * * *